US006731205B2

(12) United States Patent
Schofield et al.

(10) Patent No.: US 6,731,205 B2
(45) Date of Patent: May 4, 2004

(54) SELF TRAINING TIRE PRESSURE MONITORING SYSTEM

(75) Inventors: Kenneth Schofield, Holland, MI (US); Niall R. Lynam, Holland, MI (US)

(73) Assignee: Donnelly Corporation, Holland, MI (US)

(*) Notice: Subject to any disclaimer, the term of this patent is extended or adjusted under 35 U.S.C. 154(b) by 0 days.

(21) Appl. No.: 10/206,495

(22) Filed: Jul. 26, 2002

(65) Prior Publication Data
US 2003/0030553 A1 Feb. 13, 2003

Related U.S. Application Data

(60) Provisional application No. 60/310,276, filed on Aug. 6, 2001.

(51) Int. Cl.[7] ............................................. B60C 23/00
(52) U.S. Cl. ...................... 340/444; 340/442; 340/443; 116/34 R; 73/146.2
(58) Field of Search ............................. 340/444, 442, 340/443; 116/34 R, 34 A; 73/146, 146.2, 146.5

(56) References Cited

U.S. PATENT DOCUMENTS

| | | | |
|---|---|---|---|
| 4,065,750 A | 12/1977 | Duncan et al. | 340/442 |
| 4,646,673 A | 3/1987 | Fordyce | 116/34 R |
| 4,895,097 A | 1/1990 | Lechnir | 116/34 R |
| 5,371,659 A | 12/1994 | Pastrick et al. | 362/83.1 |
| 5,463,374 A | 10/1995 | Mendez et al. | 340/442 |
| 5,497,306 A | 3/1996 | Pastrick | 362/83.1 |
| 5,540,092 A | 7/1996 | Handfield et al. | 73/146.5 |
| 5,600,301 A | 2/1997 | Robinson, III | 340/442 |
| 5,612,671 A | 3/1997 | Mendez et al. | 340/447 |
| 5,661,651 A | 8/1997 | Geschke et al. | 364/424.034 |
| 5,669,705 A | 9/1997 | Pastrick et al. | 362/83.1 |
| 5,760,682 A | 6/1998 | Liu et al. | 340/444 |
| 5,764,137 A | 6/1998 | Zarkhin | 340/444 |
| 5,774,048 A | 6/1998 | Achterholt | 340/447 |
| 5,786,772 A | 7/1998 | Schofield et al. | 340/903 |
| 5,801,305 A * | 9/1998 | Kawai et al. | 73/146.2 |
| 5,825,286 A | 10/1998 | Coulthard | 340/447 |
| 5,863,116 A | 1/1999 | Pastrick et al. | 362/494 |
| 5,926,087 A | 7/1999 | Busch et al. | 340/438 |
| 6,092,028 A * | 7/2000 | Naito et al. | 702/47 |
| 6,124,647 A | 9/2000 | Marcus et al. | 307/10.1 |
| 6,137,400 A * | 10/2000 | Yanase et al. | 340/442 |
| 6,176,602 B1 | 1/2001 | Pastrick et al. | 362/494 |
| 6,243,007 B1 * | 6/2001 | McLaughlin et al. | 340/447 |
| 6,259,361 B1 | 7/2001 | Robillard et al. | 340/447 |
| 6,276,821 B1 | 8/2001 | Pastrick et al. | 362/494 |
| 6,294,989 B1 | 9/2001 | Schofield et al. | 340/442 |
| 6,296,379 B1 | 10/2001 | Pastrick et al. | 362/494 |
| 6,323,765 B1 * | 11/2001 | Horie et al. | 340/442 |
| 6,448,891 B2 * | 9/2002 | Barnett | 340/438 |

* cited by examiner

Primary Examiner—Toan Ngoc Pham
(74) Attorney, Agent, or Firm—Van Dyke, Gardner, Linn & Burkhart, LLP

(57) ABSTRACT

A self training tire pressure monitoring system for a vehicle includes at least two pressure sensors, at least two wheel sensors and a control. The pressure sensors are positioned at respective tires and are operable to provide a measured pressure output indicative of the pressure of the respective tires. The wheel sensors are positioned at respective wheels of the vehicle and are operable to provide a characteristic output indicative of rotation of the wheels over a period of time. The control receives the characteristic outputs and the measured pressure outputs and is operable to integrate the outputs to determine the particular wheels at which the pressure sensors and associated tires are positioned. The measured pressure and location of the tires may be displayed at a display of the vehicle. Preferably, the control deduces a deduced rolling radius of the tires in response to the characteristic output of the wheel sensors.

55 Claims, 3 Drawing Sheets

SELF TRAINING TIRE PRESSURE MONITORING SYSTEM

CROSS REFERENCE TO RELATED APPLICATION

The present application claims priority of U.S. provisional application, Ser. No. 60/310,276, filed Aug. 6, 2001 by Schofield et al., entitled TIRE PRESSURE MONITORING SYSTEM which is hereby incorporated by reference herein in its entirety.

FIELD OF INVENTION

The present invention relates to tire pressure monitoring systems and, more particularly, to the characterization of a low-pressure or high-pressure condition occurring in one or more tires of a set of tires mounted on the vehicle, and most particularly, to identification of the location or particular wheels of the vehicle that the particular tire or tires are located.

BACKGROUND OF INVENTION

There are several advantages to maintaining the pneumatic tires of an automobile at the inflation pressure recommended by the tire or vehicle manufacturer. Vehicle handling characteristics are maintained when all tires are inflated to the condition specified by the vehicle designer. The loss of pressure in one or more tires on the vehicle may result in less than optimum driver control and therefore a reduced safety condition. Inadvertent over-inflation of one or more tires may also result in less than optimum vehicle handling. Operating a vehicle with tire pressures outside the recommended inflation range can also reduce tire life due to excessive flexing and heating and resultant fatigue or wear. Also, operating a vehicle with under-inflated tires can significantly decrease fuel efficiency. Tire pressure monitoring systems have been developed which alert the vehicle operator when the pressure in one or more of the tires fitted to the vehicle is outside a predetermined range.

So called run-flat tires can puncture and lose air pressure without the drivers knowledge. The tire manufacturer typically specifies a distance and maximum speed for operation in the run-flat condition. It is important for the driver to know when the run flat condition occurred so that operating the tire beyond its safe limits may be avoided. Consequently, tire pressure monitoring systems are typically installed on vehicles equipped with run-flat tires, but due to the dangers associated with sudden tire degradation on the likes of sports utility vehicles and the like, tire monitoring systems are being used widely on many types of vehicles.

Indeed, following an increase in public awareness of the potential consequences of operating tires outside the manufacturers recommended pressure range, legislation has been introduced such as proposed FMVSS 138 which requires that a tire pressure monitoring system be installed as original equipment on all new vehicles sold in the United States after November, 2003.

While several tire pressure-monitoring methods have been proposed, two general approaches have been favored. One is indirect and relies on the determination of the rolling radius of each hub and tire assembly (and often linked to the anti-lock brake system (ABS) of the vehicle). The second is direct and relies on the wireless transmission of a signal from a transducer module installed in the pressurized cavity of each tire. Such systems work well for their intended purposes, but there are disadvantages.

The rolling radius method relies on the signals generated by wheel rotation sensors, typically installed as part of an anti-lock braking system. The rolling radius represents the actual radius from the center of the tire to the generally flattened area of the tire in contact with the ground. Because of the flattening at the point of contact of the tire and the road or surface, the rolling radius measures smaller than the nominal radius of the tire as manufactured or unloaded, since the nominal radius does not account for variation in pressure within the tire and load on the tire. Since the rotational speed of each wheel is known accurately, the rolling radius of the hub and tire assembly mounted at each wheel can be inferred. This system of tire pressure monitoring (frequently referred to in the art as ABS-tire pressure monitoring) does not, however, provide absolute values of pressure, nor does it provide tire temperature information. If all of the tires on the vehicle were to lose pressure equally over time, such a system may fail to detect a reduction in pressure in any tire. Also, this system requires that data be gathered over some minimum number of wheel rotations in order to allow tire temperatures to equalize to some extent, to determine relative rolling radii, and then to approximate each tire pressure. This type of system is not well suited to anything other than installation as original equipment. While this type of system is a low cost addition to a vehicle equipped with anti-lock brakes, it has many performance shortcomings. Since the wheel rotation can only be monitored when the wheel is rotating, this type of system cannot be used to monitor the condition of a spare tire carried on the vehicle, nor can it provide an instant indication of a flat tire when the ignition switch is operated. It is not uncommon to have a slow air leak from a tire due to the penetration of a sharp object such as a nail, screw or other small metallic object, through the tire wall, typically in the tread area. Such a rate of pressure loss may not cause the driver to notice the condition while driving, but when left for a prolonged period, such as overnight parking, the pressure loss may result in a sufficiently flat tire such that driving the vehicle may permanently damage or weaken the tire. Since the driver may approach the vehicle without sight of the damaged or at least partially deflated tire, it is preferable that the pressure monitoring system provides warning immediately on operation of the ignition switch.

The direct sensing method requires the installation of a wireless module in contact with the gas within the pressurized cavity of each tire and hub assembly. A matched receiving module is installed on a fixed portion of the vehicle such that the transmitted data may be processed and presented to the vehicle operator as required. A receiver may be positioned within each wheel well of the vehicle, in which case it is necessary to install one receiver for each monitored tire on the vehicle, or, a single receiver may be placed approximately centrally within the vehicle, such as at the interior rearview mirror location. The advantages of multiple receivers are that transmission distances can be short, thus conserving power, and that data is associated with the receiver location, thus avoiding system training. The significant disadvantage of multiple receivers is the high additional cost. Additionally, installation is difficult unless as original equipment. The potential disadvantages of a single receiver include more complex coding to avoid transmitter confusion, and the need for a greater transmission range, both of which have adverse power implications. A significant disadvantage of the single receiver approach is the need for system training. Each transmitter in the system is identified by a unique code so the receiver always associates data with a particular tire being monitored by a particular pressure sensor but, without a complex and currently impractical antenna configuration, the system cannot determine the wheel location that the particular tire is actually located on. Also, since tires are commonly rotated or replaced by a spare, it is necessary to train the system. Training may consist of manually reducing the air pressure in a predetermined tire until the system indicates it has detected a loss of pressure, re-inflating to the correct pressure and, repeating for all other monitored tires in the system in a predetermined sequence. Training must be repeated whenever a receiver position is changed.

It is known to identify the tire location by utilizing a temperature sensor and an accelerometer sensor at each tire of the vehicle, such as disclosed in U.S. Pat. No. 6,259,361, which is hereby incorporated herein by reference. The temperature sensor may indicate whether it is positioned at the front or rear tires due to temperature differences typically present between the front and rear tires. The accelerometer sensor may determine a rolling direction of the tires, in order to determine whether the tires are on the left or right side of the vehicle. Such a pressure sensing system may include multiple components and/or systems, in addition to the pressure sensors at each tire, and thus may be complex and expensive to implement.

Thus, there is a need for an improved tire pressure monitoring system that overcomes the above disadvantages.

SUMMARY OF THE INVENTION

The present invention is intended to provide a self training tire pressure monitoring system which may sense the tire pressure of each tire of a vehicle with a respective pressure sensor and may determine at which wheel of the vehicle wheel set that the particular tire being monitored with the pressure sensor is located. The tire pressure and the respective location or wheel of the tire may be displayed at a display of the vehicle.

According to an aspect of the present invention, a self training tire pressure monitoring system for a vehicle having a set of tires includes first and second pressure sensors, first and second wheel sensors and a control. The pressure sensors are positioned at respective tires of a set of tires of the vehicle. The pressure sensors are operable to provide measured pressure outputs indicative of the actual measured gaseous pressure (i.e., typically air pressure) of the respective tires that inflates the respective tires. The wheel sensors are positioned at the wheels of the vehicle. The tires are mounted on respective wheels. The wheel sensors are operable to provide characteristic outputs indicative of rotation of the respective wheels. The control receives the characteristic outputs and the measured pressure outputs and is operable to deduce a deduced characteristic indicative of pressure variation in the tire mounted on a particular wheel in response to the characteristic output indicative of rotation of the particular wheel. The control is operable to integrate, such as by comparison or by other algorithmic and/or computational manipulation, the actual measured pressure outputs and the deduced characteristic signatures to associate the pressure sensors and respective tires with the particular location or wheels at which the particular pressure sensors and tires are positioned. A display is operable to indicate the measured pressure of the tire at a particular wheel of the vehicle.

Preferably, the control is operable to correlate the pressure outputs (as received, preferably in real time, from the pressure sensors at the tires) with the deduced characteristics (preferably calculated from data received from a rolling radius monitoring or deducing system) to match the pressure output of each of the pressure sensors with one of the deduced characteristics. Preferably, the control is operable to deduce the deduced characteristics over a period of time to define deduced characteristic signatures indicative of pressure variations in the tires mounted on the particular wheels over the period of time. Preferably, the control is operable to deduce the deduced characteristic in response to at least one a rolling radius of the tires, a temperature of the tires, a wheel speed of the tires, a wheel rotation of the tires, a wheel position of the tires, a vehicle speed, a differential of the vehicle and a wheel slip sensor of the vehicle.

In one form, the control is operable to deduce a deduced rolling radius for the tire mounted on each wheel in response to the characteristic outputs. The deduced rolling radius may be calculated in response to a rotation of the wheels and a vehicle velocity. The deduced rolling radius may be calculated over a period of time to define deduced rolling radius signatures. The control is operable to correlate the measured pressure outputs with the deduced rolling radius signatures to match the pressure outputs of the pressure sensors with the deduced rolling radius signatures.

In another form, the pressure sensors are operable to provide the actual measured pressure output to the control via a radio frequency communication link. The pressure sensors may include a pressure transducer, a temperature sensing means, a processor and a transmitter. The control may include an antenna and a receiver.

According to another aspect of the present invention, a method for determining a pressure and location or wheel of at least two tires of a vehicle includes sensing a measured pressure within at least two tires of a vehicle in response to pressure sensors at respective tires of the at least two tires and deducing a deduced characteristic signature at respective wheels which is indicative of pressure variations in the tires mounted at the respective wheels of the vehicle. The measured pressures and the deduced characteristic signatures are correlated to determine the location or particular wheel at which each of the tires is mounted. The measured pressure of the tire and the particular wheel of the vehicle at which the tire is mounted is displayed on a display of the vehicle.

Preferably, the method includes communicating the sensed pressure to a control via a radio frequency communication link. Preferably, the deduced characteristic signature is deduced over a period of time to define a time dependent deduced characteristic signature.

Preferably, the deduced characteristic signature is deduced in response to a deduced rolling radius of the at least two tires of the vehicle, a temperature of the at least two tires, a wheel speed of the at least two wheels, a wheel position of the at least two wheels, a wheel rotation of the at least two wheels, a speed of the vehicle, a differential of the vehicle and/or a wheel slip sensor of the vehicle. Preferably, the deduced characteristic signatures are deduced in response to an estimated rolling radius of each of the at least two tires. The rolling radius may be determined or approximated in response to an input from a wheel speed sensor, a wheel rotation sensor, a wheel position sensor, a rotary encoder, a vehicle speed sensor, a temperature sensor, a steering wheel, a differential, a wheel slip sensor and/or the like.

According to yet another aspect of the present invention, a self training tire pressure monitoring system for a vehicle having a set of tires includes at least two pressure sensors, at least two wheel sensors, a control and a display. The at least two pressure sensors are positioned at respective tires of a set of tires of the vehicle. The at least two pressure sensors are operable to provide a measured pressure output indicative of the actual pressure of the respective tires. The wheel sensors are positioned at respective wheels of the vehicle. The wheel sensors are operable to provide a wheel rotation output indicative of rotation of the respective wheels. The control receives the measured pressure outputs and the wheel rotation outputs and deduces a deduced rolling radius for the tire mounted at a particular wheel in response to the wheel rotation output indicative of rotation of the particular wheel. The control is operable to integrate the measured pressure outputs and the deduced rolling radii to determine the particular wheels at which the pressure sensors and associated tires are positioned. The display is operable to indicate the measured pressure of the tire and the particular wheel at which the tire is mounted.

Therefore, the present invention provides a self training tire pressure monitoring system which is operable to determine the tire pressure of at least two tires of a vehicle and to determine at which of the wheels of the vehicle the detected pressures and associated tires are positioned. The tire pressure monitoring system of the present invention may include a wireless communication with the tire pressure sensor at each tire of the vehicle and may determine where the sensor and tire have been moved to, such as when the tires are rotated on the vehicle to minimize uneven wear of the tires. The tire pressure monitoring system of the present invention provides for generally continuous monitoring of tire pressure irrespective of vehicle movement and may provide an indication of a flat tire before the vehicle is moved. The tire pressure monitoring system may detect a change in pressure of a tire of the vehicle and may indicate which tire is experiencing the change in pressure and at which wheel the tire is located. The tire pressure monitoring system may indicate the pressure for each tire and may indicate the location of the tires on the vehicle with a single receiver and control positioned within the interior of the vehicle, thereby reducing the costs of the monitoring system. The tire pressure monitoring system of the present invention automatically determines the location or wheels at which the particular pressure sensors and tires are located, without requiring manual training of the control each time the tires are changed or rotated. The location of the pressure sensors and tires may be determined by comparing the measured pressures in the tires with a deduced characteristic or deduced characteristic signature, such as a characteristic signature indicative of variations or undulations in the rolling radius of the tires and/or the pressure in the tires.

These and other objects, advantages, purposes, and features of the present invention will become more apparent from the study of the following description taken in conjunction with the drawings.

DESCRIPTION OF THE PREFERRED EMBODIMENTS

Figure 1:
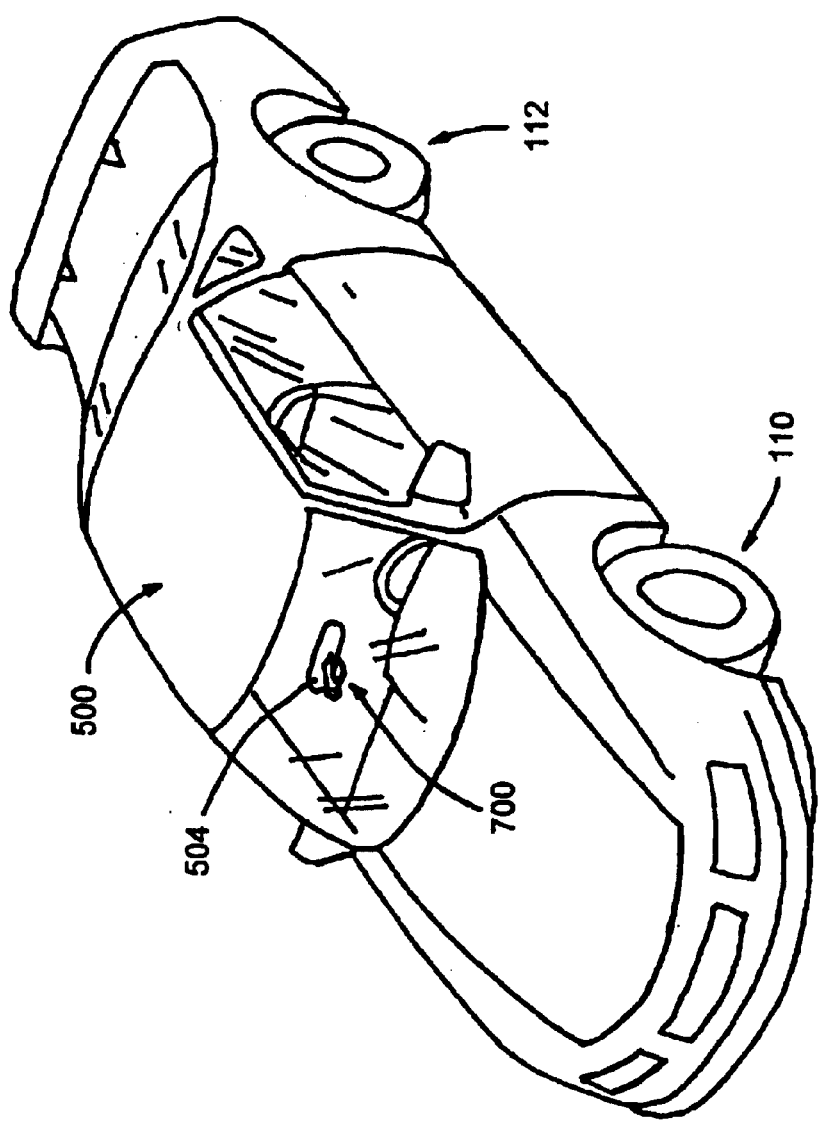
FIG. 1 is a front perspective view of a vehicle incorporating the tire pressure monitoring system of the present invention.
Figure 2:
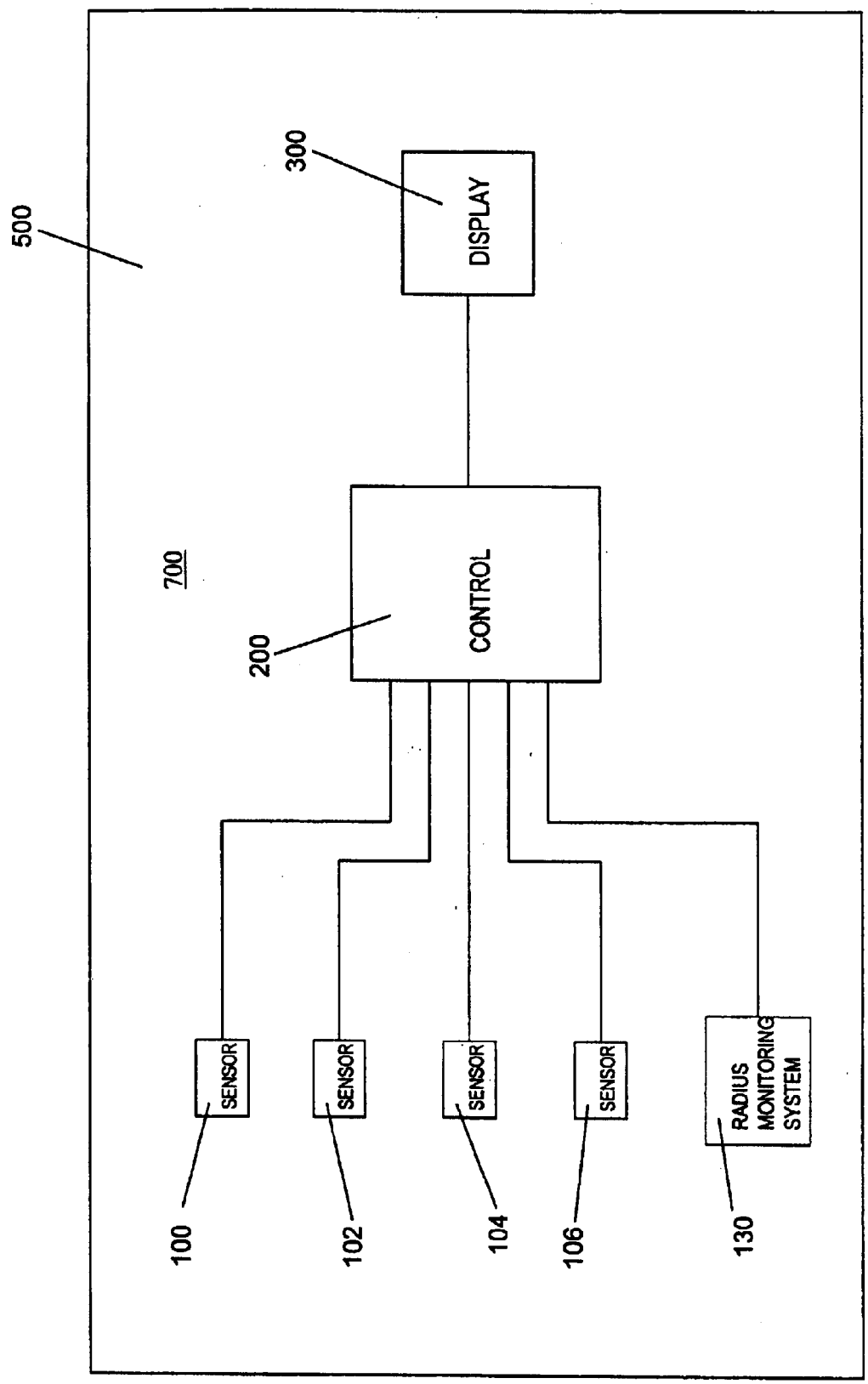
FIG. 2 is a block diagram of a tire pressure monitoring system in accordance with the present invention.
Figure 3:
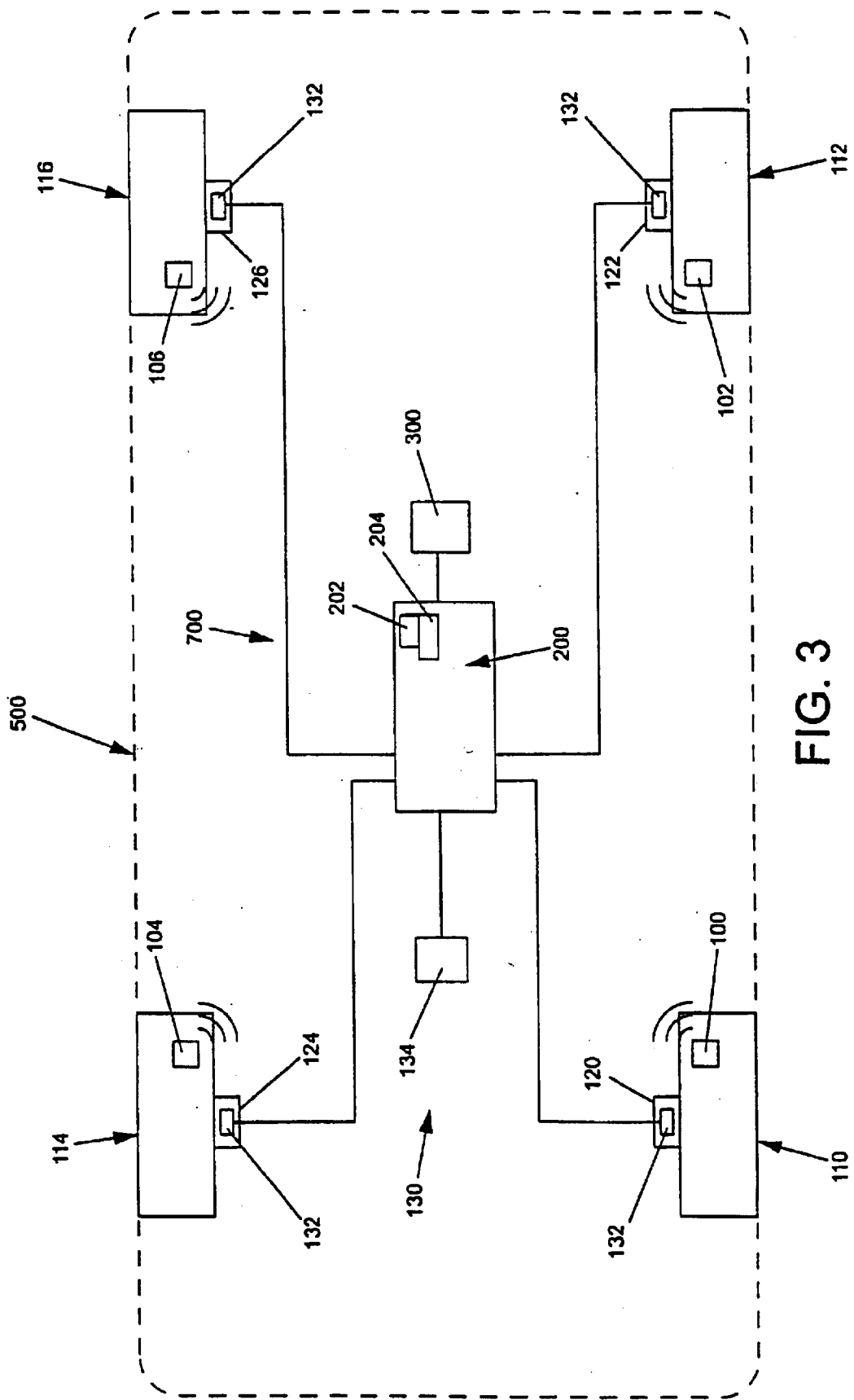
FIG. 3 is another block diagram of the tire pressure monitoring system of the present invention.

Referring now specifically to the drawings and the illustrative embodiments depicted therein, a self training tire pressure monitoring system 700 of the present invention includes a tire pressure sensor 100, 102, 104, 106 at each tire 110, 112, 114, 116 mounted at each wheel 120, 122, 124, 126 of a vehicle 500 (FIGS. 1–3). For example, tire pressure sensors 100, 102, 104, 106 may be respectively located in a tire 110 mounted at the driver-side front wheel 120, a tire 112 mounted at the driver-side rear wheel 122, a tire 114 mounted at the passenger-side front wheel 124, and a tire 116 mounted at the passenger-side rear wheel 126 on vehicle 500. Such sensors include a pressure transducer capable of measuring tire inflation pressure, and preferably include a transmitter (such as a radio frequency (RF) transmitter or the like) for wireless communication of this data to a control 200 located in the interior of the vehicle. Tire pressure sensors 100, 102, 104, 106 provide an actual measured pressure output for the actual measured tire pressure in the respective tires to the control 200. The sensors are moved with their respective tires when the tires are changed or rotated, while the wheel locations remain fixed on the vehicle. Tire pressure monitoring system 700 is a self training tire pressure monitoring system which is operable to determine the pressure of each tire of the vehicle and the particular location or wheel of the vehicle at which each of the tires is mounted or located.

The term "tire", as used herein, refers to the tire and hub combination or assembly, which is mounted to a wheel of the vehicle. Also, the term "wheel" refers to the particular rotatable portion of the corner assembly or the like of the vehicle. Each wheel includes the lugs or studs extending therefrom (on which the hub and tire is mounted) and may include the rotor or drum of the brake system of the vehicle. The tires and associated sensors may be rotated or moved from one wheel of the vehicle to another, while the wheels remain generally fixedly positioned at the respective corners of the vehicle.

Sensors 100, 102, 104, 106 may be installed by strapping or otherwise attaching the sensors to the hub rim within the tire, by replacing the tire valve stem with a combined tire valve and sensing module, or by attachment of the sensors to the exterior of the existing tire valve, or by any other means which mounts or positions the sensors at least partially within or in communication with the pressurized chambers of the tires, without affecting the scope of the present invention. Sensors 100, 102, 104, 106 may be battery powered, may use wheel motion to generate power, or may rely on induction from a source mounted on a fixed portion of the vehicle, without affecting the scope of the present invention. Each of the sensors 100, 102, 104, 106 preferably incorporates a pressure transducer, a temperature sensing means, a processor to encode data in a format unique to the module, and a transmitter, such as an RF transmitter or the like.

Control 200 includes an antenna 202 (such as a radio frequency or RF antenna) and a receiver 204 (and preferably a single-receiver) for tire pressure signals wirelessly broadcast from sensors 100, 102, 104, 106 (as shown in FIG. 3). Control 200 is positioned within the interior of the vehicle, and preferably at, within or on an interior mirror assembly 504 (FIG. 1) or at, within or on an overhead console (not shown) in the interior cabin of the vehicle. The control 200 may receive a generally continuous input from each of the pressure sensors and may generate a pressure pattern or pressure signature for the particular tire and sensor combination for a given period of time, such as for a predetermined period of time following each activation of the vehicle ignition or the like.

Tire pressure monitoring system 700 also includes a rolling radius monitoring system 130 that also provides an input (either by wired connection or by wireless connection) to control 200. The rolling radius monitoring system 130 includes a wheel sensor 132 positioned at each wheel 120, 122, 124, 126 or corner assembly or the like of the vehicle. The wheel sensor 132 provides a wheel output, such as wheel rotational speed or rotational position or the like, to control 200. Control 200 is operable to deduce, estimate or approximate a pressure within the tires, a rolling radius of the tires, or any other characteristic associated with the tires, which may be indicative of tire pressure variation within the tires associated with or mounted to the particular wheels of the vehicle. Control may be operable to deduce or calculate such characteristic(s) over a predetermined period of time, such as for a period of time following each activation of the vehicle ignition or the like, to generate a characteristic pattern or characteristic signature over the period of time for the tires mounted at the particular wheels of the vehicle. The control is operable to deduce or calculate the pressure or characteristic patterns or signatures for the tires based on a rolling radius input (which may include tire or wheel rotational velocity data and/or vehicle velocity data), as discussed below.

Rolling radius monitoring system 130 preferably is fixedly positioned at each of the wheels associated with the tires which are being monitored. For example, rolling radius monitoring system 130 may include a wheel sensor 132, such as a wheel speed sensor or wheel rotation sensor, at each wheel or corner assembly of the vehicle (as shown in FIG. 3), such that the wheel sensors of the rolling radius monitoring system are not moved or changed when the tires are changed or rotated. This provides a known location of the wheel sensors associated with the rolling radius monitoring system, regardless of which tire and associated pressure sensor is positioned or mounted at that location or particular wheel of the vehicle.

Steering wheels, differential effects, wheel slip and other factors all impact instantaneous rolling radius, and can provide data to rolling radius monitoring system 130 and/or to control 200. These effects may all be filtered using other vehicle data or time. The rolling radius can provide an indication or an approximation of the inflation pressure of the tire. The control 200 is operable to deduce the pressure or rolling radius of the tires mounted on the wheels over a period of time, or to deduce a characteristic pattern or signature generally indicative of the pressure or of pressure variations in the tires over a period of time. The deduced characteristic does not have to be an accurate representation of the actual pressure within the tires. Rather, the pattern or signature of the deduced characteristic (which is associated with a particular wheel of the vehicle) over time may be generally representative of the pattern or signature of the actual or measured tire pressure for any given tire mounted at a particular wheel of the vehicle.

The characteristic pattern or signature for the tire at each wheel may be deduced or calculated based on data from wheel sensor 132, which may comprise a wheel speed or rotation sensor or wheel revolution counter, such as a rotary encoder or the like, at each wheel of the vehicle. The rotary encoder provides data pertaining to the actual number of rotations of the wheel over a period of time, which is indicative of the rotational velocity (such as in revolutions per second) of the particular wheel at which the rotary encoder is positioned. The rotary encoder may be a component of an ABS system of the vehicle or may be a separate component or system of the vehicle, without affecting the scope of the present invention.

Control 200 (or rolling radius monitoring system 130) also receives an input from a vehicle speed input or sensor 134 (FIG. 3), such as from a sensor at a drive shaft of the vehicle or an average rotational velocity of the tires or the like. The control 200 may then calculate the rolling radius for each tire mounted at the wheels based on the vehicle speed and rate of angular rotation of each wheel, since for a given time period, each tire will travel the same distance down the road. However, the rotational velocity of the wheels or number of rotations of the wheels during a given time or distance may vary due to different rolling radii of the tires mounted at the wheels. The calculated or deduced rolling radius (or a calculated, estimated, approximated or deduced tire pressure or some other value or signal) is indicative of actual pressure changes in the tire mounted at the particular wheel, and fluctuates or varies with the actual pressure for the tire at the particular wheel of the vehicle, since the rolling radius of a tire is a function of the pressure within the tire and the load on the tire. The deduced rolling radii or other characteristics may be deduced or calculated over a given period of time, thereby generating time dependent characteristic patterns or signatures indicative of changes in pressure for the tires associated with, positioned at or mounted at the wheels of the vehicle.

Control 200 includes a microprocessor (and, preferably, a digital signal processor comprising a microcomputer having a data processing speed of at least about 4 MIPS, more preferably at least about 8 MIPS and most preferably at least about 15 MIPS). Control 200 integrates the inputs received from pressure sensors 100, 102, 104, 106 and from rolling radius monitoring system 130, and provides an output to a display 300. Display 300 displays the tire pressure in any one or more tires of the set of tires (usually a set of four tires and, optionally, if the spare is included, a set of five tires) on the vehicle (such as via an alphanumerical display and/or a graphic display, indicator or icon) to the driver. Display 300 is preferably located at, within or on the interior mirror assembly 504 or at, within or on an overhead console in the interior cabin.

Control is operable to determine which wheel or location of the vehicle (left front, right front, left rear, right rear or spare) the particular pressure sensor and associated tire is located. Each pressure sensor will provide a signal of the actual pressure of the respective tire at any given time or over a period of time. Control is operable to compare the undulations or pattern or signature of the measured pressure signals from the pressure sensors to the undulations or pattern or signature of the deduced pressures, rolling radii or other tire characteristics as deduced in response to the rolling radius calculations. Because the rolling radius for each tire of a vehicle is typically different due to variations in temperature (such as frictional variations, ambient temperature variations surrounding the tires, and/or the like), differences in road conditions encountered by each tire, and/or any other variations which may affect the tire pressure and/or rolling radius of the tire, the tire at each wheel of the vehicle will have a particular signature or characteristic or pattern over a given period of time, particularly as the tires warm up when the vehicle is initially driven. The location of the tire corresponding to the deduced characteristic signature is known, since the deduced characteristic is calculated or deduced in response to the wheel sensor, such as the rotary encoder or the like, fixedly positioned at each wheel of the vehicle. The distinct patterns of the deduced characteristics associated with the wheels may then be compared with the measured pressure data from each pressure sensor associated with the tires to determine at which wheel the tire and associated pressure sensor is located. If one of the tires is a spare tire, the measured or actual pressure signal or pattern for that tire may be generally constant, and thus identifiable by the control.

Preferably, control 200 compares the pressure sensor output with the deduced characteristic pattern each time the ignition of the vehicle is activated (or each time the vehicle is shifted into gear or each time the vehicle is moved or driven a particular distance, or any other selected activating event or condition). It is preferred that the control is operable to compare the measured pressures with the deduced characteristic signatures to determine at which wheel the measured pressure and associated tire is positioned soon after the vehicle is started and driven. This is because the characteristic signature or pattern of the tires experiences a greater amount of change or variation during the warming up process of the tires as the vehicle is first moved down the road after sitting at rest for a prolonged period of time. However, the control may compare the measured pressures with the deduced characteristic signatures after the vehicle has been driven for a while, without affecting the scope of the present invention.

Preferably, the location or wheels at which the particular pressure sensors and tires are mounted is stored in the control's memory when the vehicle is shut off, such that the locations or wheels at which the sensors are positioned is known at the time of the next start up of the vehicle. Upon starting and driving the vehicle, control 200 may compare the pressure output data from each sensor with the particular deduced characteristic pattern or signature associated with the previously known sensor location or wheel. If the measured pressure matches the pattern or signature at the previous location or wheel at which the particular sensor and tire was located, the control need not make any further comparison of the pressure data with other patterns of deduced characteristics, since the control may conclude that the position of the tires on the vehicle has not changed from the previously known location (i.e., the tires were not rotated while the ignition was off). However, if the patterns do not match, the control may then compare each pressure sensor output with each of the other characteristic patterns or signatures for each of the other wheel locations, in order to determine the new wheel or location of the particular tire and sensor. After the wheels or locations are determined, control 200 may display the pressure outputs from the pressure sensors and the corresponding location or wheel of each output on display 300. By only conducting further comparisons of the patterns or signatures if the position of the sensor (and tire) appears to have changed, the self training tire pressure monitoring system of the present invention provides a quick confirmation of the location of the pressure sensors and tires without further evaluation of data unless such further evaluation is necessary to determine the new wheels or locations of the pressure sensors and tires.

When the vehicle is first assembled at the vehicle assembly plant, the tire and hub assemblies are mounted to the wheels of the vehicle as the vehicle is moved along the assembly line. It is envisioned that the tire and hub assemblies may be prearranged or selected and mounted to particular wheels of the set of wheels of the vehicle. The control of the tire pressure monitoring system of the present invention may be programmed or initially taught the location or wheel at which each tire and pressure sensor is mounted. Thus, at the first ignition cycle of the vehicle, and thus the first initialization of the tire pressure monitoring system, the tire pressure monitoring system may know and indicate the measured pressure for each tire and the actual location or wheel of the vehicle at which each tire is mounted. However, the tires and pressure sensors may otherwise be randomly mounted to the wheels of the vehicle and the control may be operable to receive the measured pressure data and the wheel sensor data to match the measured pressures associated with the tires with the characteristic signatures associated with the wheels (as discussed above) to determine the initial location or wheels at which the particular tires and pressure sensors are mounted, without affecting the scope of the present invention.

Control 200 thus includes a training algorithm that allows rotation of tires during service (or allows replacement of a sensor) with automatic location by control 200 of the wheel location where any sensed tire pressure condition is located. Optionally, and preferably, the tire inflation assist system as disclosed in U.S. patent application Ser. No. 09/513,941, filed Feb. 28, 2000 for TIRE INFLATION ASSISTANCE MONITORING SYSTEM, now U.S. Pat. No. 6,294,989 (DON01 P-801); U.S. patent application Ser. No. 09/876,816, filed Jun. 7, 2001 for TIRE INFLATION ASSISTANCE MONITORING SYSTEM, now U.S. Pat. No. 6,472,979 (DON01 P-904); and U.S. patent application Ser. No. 09/710,016, filed Nov. 10, 2000 for TIRE INFLATION ASSISTANCE MONITORING SYSTEM, now U.S. Pat. No. 6,445,287 (DON01 P-861), which are hereby incorporated herein by reference, can be used in conjunction with the present invention.

The present invention preferably includes the combination of rolling radius data obtained from wheel rotation sensors and associated algorithms with a single receiver wheel sensor system in order to provide a self-training system, thus achieving maximum performance at minimum cost. Thus, by combining data gathered from transducers monitoring wheel rotation with data gathered from tire pressure sensors (that may broadcast via RF wireless communication, and such as described in U.S. patent application Ser. No. 09/513,941, filed Feb. 28, 2000 for TIRE INFLATION ASSISTANCE MONITORING SYSTEM, now U.S. Pat. No. 6,294,989 (DON01 P-801); U.S. patent application Ser. No. 09/876,816, filed Jun. 7, 2001 for TIRE INFLATION ASSISTANCE MONITORING SYSTEM, now U.S. Pat. No. 6,472,979 (DON01 P-904); and U.S. patent application Ser. No. 09/710,016, filed Nov. 10, 2000 for TIRE INFLATION ASSISTANCE MONITORING SYSTEM, now U.S. Pat. No. 6,445,287 (DON01 P-861), which are hereby incorporated herein by reference) in each of the tires on the wheels of the vehicle, a tire pressure monitoring system can be provided that is self-training (and so the tires can be rotated from one location or wheel on the vehicle to another in order to even out tire wear, and such as is common when a vehicle is serviced, without concern as to what wheel location a particular tire pressure sensor and particular tire has moved to).

Optionally, and preferably, the present invention can be utilized in conjunction with the gas/pressure relationship algorithm and the autosensing sensing system utilizing a triangulation algorithm as disclosed in U.S. patent application Ser. No. 09/710,016, filed Nov. 10, 2000 for TIRE INFLATION ASSISTANCE MONITORING SYSTEM, now U.S. Pat. No. 6,445,287 (DON01 P-861), which is hereby incorporated herein by reference.

The present invention includes correlation of a measured pressure with a deduced or estimated pressure or other characteristic, such as rolling radius, which changes with and may be generally representative of pressure variations over time, in order, for example, to determine where or at which wheel a particular tire pressure sensor is located on a vehicle. For example, significant temperature differences occur between each of the tires on a vehicle as they warm up from a cold start. These temperature differences result in pressure differences that in turn result in rolling radius differences. By correlating measured pressure with deduced pressure at each tire, best matches are determined and sensor locations established.

Although shown and described as being implemented on a vehicle having four wheels, clearly the tire pressure monitoring system of the present invention is equally applicable on vehicles having less than four wheels, such as motorcycles and the like, or more than four wheels, such as trucks, trailers and the like. The control may be adapted to receive signals from at least two pressure sensors at at least two tires of any type of vehicle and to compare the pressure signals with deduced pressure or characteristic patterns of the tires mounted at the wheels of the vehicle, in order to determine the location or particular wheel of the vehicle at which the tires and associated pressure sensors are positioned.

Therefore, the self training tire pressure monitoring system of the present invention is operable to determine the tire pressure of at least two tires of a vehicle and to determine the location or wheel of the detected pressure (i.e., which wheel the tire associated with the sensed or detected tire pressure corresponds to). The tire pressure monitoring system may include a wireless communication with the tire pressure sensor at each tire of the vehicle and may determine where the sensors and tires are located and where they have been moved to, such as when the tires are rotated on the vehicle to minimize uneven wear of the tires. The tire pressure monitoring system of the present invention may include only a single receiver for the signals of the tire pressure sensors, thereby reducing the costs of the monitoring system. The tire pressure monitoring system of the present invention provides for generally continuous monitoring of tire pressure irrespective of vehicle movement and may provide an indication of a flat tire before the vehicle is moved. The tire pressure monitoring system may detect a change in pressure (or a low pressure or high pressure condition) of a tire of the vehicle and may indicate at which wheel the tire that is experiencing the change in pressure (or low pressure or high pressure condition) is mounted. The tire pressure monitoring system of the present invention automatically determines the location of the pressure sensors, without requiring manual training of the control each time the tires are changed or rotated.

The self training tire pressure monitoring system of the present invention determines the location of the pressure sensors by comparing undulations, variations or patterns in the deduced characteristic signature (which is generally indicative of changes in tire pressure for the tire mounted at a particular wheel) for each tire location or wheel with the undulations, variations or patterns in the measured pressure output from each pressure sensor. The present invention thus compares time variant signatures of measured tire pressures with time variant signatures of deduced pressures within the tires or deduced rolling radii of the tires or other characteristics generally indicative of pressure changes within the tires, in order to determine which measured tire pressure corresponds with which deduced characteristic, thereby determining the location or wheel at which the measured tire pressure and thus the particular tire is positioned. The present invention is thus operable to monitor and match patterns of actual pressure change in the tires over time with patterns representative of deduced pressure change in the tires over time. If the tires are rotated, the patterns are re-matched to determine the new location or wheels of the vehicle at which the tires are mounted. Because the measured or actual pressures are associated with particular or respective tires (which may be moved) and the deduced characteristics or deduced pressure changes are associated with the particular or respective wheels of the vehicle (which are generally fixedly positioned on the vehicle), matching of the actual pressures with the deduced characteristic signatures determines the location or wheel at which each particular tire is mounted.

Changes and modifications in the specifically described embodiments can be carried out without departing from the principles of the present invention, which is intended to be limited by the scope of the appended claims as interpreted according to the principles of patent law.

The embodiments of the invention in which an exclusive property or privilege is claimed are defined as follows:

1. A self training tire pressure monitoring system for a vehicle having a set of tires, each of the tires being mounted at respective ones of a set of wheels of the vehicle, said self training tire pressure monitoring system comprising:

first and second pressure sensors, said first and second pressure sensors being positioned at respective tires of at least two tires of the vehicle, said first and second pressure sensors being operable to provide measured pressure outputs indicative of the actual pressure of the respective tires;

first and second wheel sensors positioned at respective ones of at least two wheels of the vehicle, the at least two tires being mounted on respective wheels of the at least two wheels, said first and second wheel sensors being operable to provide characteristic outputs indicative of rotation of the respective wheels;

a control receiving said characteristic outputs and said measured pressure outputs, said control being operable to deduce a deduced characteristic indicative of pressure variation in the tire mounted on a particular wheel in response to said characteristic output indicative of rotation of the particular wheel, said control being operable to integrate said measured pressure outputs and said deduced characteristics to associate said at least two pressure sensors and respective tires with the particular wheels at which said at least two pressure sensors and respective tires are positioned; and a display operable to indicate the measured pressure of the tire at a particular wheel of the vehicle.

2. The self training tire pressure monitoring system of claim 1, wherein said control is operable to correlate said measured pressure outputs with said deduced characteristics to match the pressure output of each of said first and second pressure sensors with one of said deduced characteristics.

3. The self training tire pressure monitoring system of claim 1, wherein said control is operable to deduce said deduced characteristics in response to at least one of a deduced rolling radius of the at least two tires, a temperature of the at least two tires, a wheel speed of the at least two wheels, a wheel position of the at least two wheels, a wheel rotation of the at least two wheels, a speed of the vehicle, a differential of the vehicle and a wheel slip sensor of the vehicle.

4. The self training tire pressure monitoring system of claim 1, wherein said control is operable to deduce said deduced characteristics over a period of time to define deduced characteristic signatures indicative of pressure variations in the tires mounted on the particular wheels over said period of time.

5. The self training tire pressure monitoring system of claim 1, wherein said deduced characteristics comprise deduced rolling radii of the at least two tires.

6. The self training tire pressure monitoring system of claim 5, wherein said control integrates said measured pressure outputs and said deduced rolling radii to determine the particular wheels at which said first and second pressure sensors and associated tires are located.

7. The self training tire pressure monitoring system of claim 6, wherein said control is operable to deduce said deduced rolling radii in response to a rotation of the at least two wheels and a vehicle velocity.

8. The self training tire pressure monitoring system of claim 7, wherein each of said first and second wheel sensors comprises at least one of a wheel speed sensor, a wheel rotation sensor and a rotary encoder.

9. The self training tire pressure monitoring system of claim 5, wherein said control is operable to deduce said deduced rolling radii over a period of time to define deduced rolling radius signatures indicative of pressure variations in the tires mounted on the particular wheels over said period of time.

10. The self training tire pressure monitoring system of claim 9, wherein said control is operable to compare said measured pressure outputs with said deduced characteristic signatures to determine the particular wheels at which said at least two pressure sensors and the associated tires are positioned.

11. The self training tire pressure monitoring system of claim 10, wherein each of said first and second wheel sensors comprises at least one of a wheel speed sensor, a wheel rotation sensor, a wheel position sensor, a rotary encoder, a temperature sensor, a steering wheel, a differential and a wheel slip sensor.

12. The self training tire pressure monitoring system of claim 1, wherein said first and second pressure sensors are operable to provide said measured pressure output to said control via a wireless communication link.

13. The self training tire pressure monitoring system of claim 1, wherein said control comprises a microprocessor.

14. The self training tire pressure monitoring system of claim 1, wherein said control comprises a digital signal processor comprising a microcomputer.

15. The self training tire pressure monitoring system of claim 1, wherein each of said first and second pressure sensors comprises a pressure transducer, a temperature sensing means, a processor and a transmitter.

16. The self training tire pressure monitoring system of claim 1, wherein each of said first and second pressure sensors comprises a pressure transducer and a transmitter.

17. The self training tire pressure monitoring system of claim 16, wherein said transmitter of said first and second pressure sensors comprises a radio frequency transmitter.

18. The self training tire pressure monitoring system of claim 17, wherein said control comprises a radio frequency antenna and a receiver.

19. The self training tire pressure monitoring system of claim 1, wherein said set of tires comprises four tires of a vehicle and said self training tire pressure monitoring system comprises first, second, third and fourth pressure sensors and first, second, third and fourth wheel sensors.

20. The self training tire pressure monitoring system of claim 19, wherein each of said first, second, third and fourth pressure sensors is positioned at a corresponding one of said at least four tires of the vehicle.

21. The self training tire pressure monitoring system of claim 1, wherein said control is positioned at, within or on an interior rearview mirror assembly of the vehicle.

22. The self training tire pressure monitoring system of claim 21, wherein said display is positioned at, within or on said interior rearview mirror assembly of the vehicle.

23. A method for determining a pressure and location of each of at least two tires of a vehicle, the at least two tires being mounted at respective ones of at least two wheels of the vehicle, said method comprising:

sensing a measured pressure within at least two tires of a vehicle in response to pressure sensors at respective tires of the at least two tires;

deducing a deduced characteristic signature at respective wheels of at least two wheels of the vehicle, said deduced characteristic signature being indicative of pressure variations in the tires mounted at the respective wheels of the vehicle;

correlating said measured pressures with said deduced characteristic signatures to determine the particular wheel at which each of the at least two tires is mounted; and displaying the measured pressure of the tire at the particular wheel of the vehicle.

24. The method of claim 23 including communicating the measured pressure to a control via a radio frequency communication link.

25. The method of claim 23, wherein deducing a deduced characteristic signature comprises deducing a deduced characteristic signature over a period of time to define a time dependent deduced characteristic signature.

26. The method of claim 23, wherein deducing a deduced characteristic signature includes deducing a deduced characteristic signature in response to at least one of a deduced rolling radius of the at least two tires, a temperature of the at least two tires, a wheel speed of the at least two wheels, a wheel position of the at least two wheels, a wheel rotation of the at least two wheels, a speed of the vehicle, a differential of the vehicle and a wheel slip sensor of the vehicle.

27. The method of claim 23, wherein deducing a deduced characteristic signature includes deducing a deduced characteristic signature corresponding to a rolling radius of the at least two tires of the vehicle.

28. The method of claim 27, wherein deducing a deduced characteristic signature corresponding to a rolling radius of the at least two tires of the vehicle comprises deducing a deduced characteristic signature in response to an input from at least one of a wheel speed sensor, a wheel rotation sensor, a wheel position sensor, a rotary encoder, a vehicle speed sensor, a temperature sensor, a steering wheel, a differential and a wheel slip sensor.

29. The method of claim 27, wherein deducing a deduced characteristic signature comprises deducing a deduced characteristic signature over a period of time to define a time dependent deduced rolling radius signature.

30. A self training tire pressure monitoring system for a vehicle having a set of tires, the tires being mounted at respective ones of a set of wheels of the vehicle, said self training tire pressure monitoring system comprising:

at least two pressure sensors, said at least two pressure sensors being positioned at respective tires of a set of tires of the vehicle, said at least two pressure sensors being operable to provide a measured pressure output indicative of the actual pressure of the respective tires;

at least two wheel sensors, said at least two wheel sensors being positioned at respective wheels of the vehicle, said at least two wheel sensors being operable to provide a wheel rotation output indicative of rotation of the respective wheels;

a control receiving said measured pressure outputs and said wheel rotation outputs, said control being operable to deduce a deduced rolling radius for the tire mounted at a particular wheel in response to said wheel rotation output indicative of rotation of the particular wheel, said control being operable to integrate said measured pressure outputs and said deduced rolling radii to determine the particular wheels at which said at least two pressure sensors and associated tires are positioned; and a display operable to indicate the measured pressure of the tire at a particular wheel of the vehicle.

31. The self training tire pressure monitoring system of claim 30, wherein said control is operable to deduce said deduced rolling radii in response to at least one of a temperature of the at least two tires, a wheel speed of the at least two wheels, a wheel position of the at least two wheels, a wheel rotation of the at least two wheels, a speed of the vehicle, a differential of the vehicle and a wheel slip sensor of the vehicle.

32. The self training tire pressure monitoring system of claim 30, wherein said deduced rolling radii are calculated in response to a rotational velocity of the at least two wheels and a vehicle velocity.

33. The self training tire pressure monitoring system of claim 30, wherein said at least two wheel sensors comprise at least one of at least two wheel speed sensors, at least two wheel rotation sensors, at least two wheel position sensors, at least two rotary encoders, at least two temperature sensors, a steering wheel, a differential and a wheel slip sensor.

34. The self training tire pressure monitoring system of claim 30, wherein said at least two wheel sensors comprise at least two wheel speed sensors.

35. The self training tire pressure monitoring system of claim 30, wherein said at least two wheel sensors comprise at least two wheel position sensors.

36. The self training tire pressure monitoring system of claim 30, wherein said at least two wheel sensors comprise at least two rotary encoders.

37. The self training tire pressure monitoring system of claim 30, wherein said control is operable to correlate said measured pressure outputs with said deduced rolling radii to match each of the measured pressure outputs of said at least two pressure sensors with one of said deduced rolling radii.

38. The self training tire pressure monitoring system of claim 37, wherein said control is operable to deduce said deduced rolling radii in response to a rotational velocity of the at least two wheels and a vehicle velocity.

39. The self training tire pressure monitoring system of claim 30, wherein said control is operable to deduce a deduced pressure of the at least two tires mounted on the wheels in response to said wheel rotation outputs.

40. The self training tire pressure monitoring system of claim 39, wherein said control is operable to deduce said deduced pressures over a period of time to define deduced pressure signatures indicative of pressure variations in the tires mounted on the wheels over said period of time.

41. The self training tire pressure monitoring system of claim 40, wherein said control is operable to correlate said measured pressure outputs with said deduced pressure signatures to match each of said measured pressure outputs of said at least two pressure sensors with one of said deduced pressure signatures.

42. The self training tire pressure monitoring system of claim 30, wherein said control is operable to deduce each of said deduced rolling radii over a period of time to define a deduced rolling radius signature, said control being operable to compare said measured pressure outputs over said period of time with said deduced rolling radius signatures to determine the particular wheels at which the tires and said at least two pressure sensors are positioned.

43. The self training tire pressure monitoring system of claim 42, wherein said period of time comprises a period of time following an activating event of said tire pressure monitoring system.

44. The self training tire pressure monitoring system of claim 43, wherein said activating event comprises at least one of an activation of an ignition of the vehicle, a shifting into a forward or reverse gear of the vehicle and a movement of the vehicle.

45. The self training tire pressure monitoring system of claim 30, wherein said at least two pressure sensors are operable to provide said measured pressure outputs to said control via a wireless communication link.

46. The self training tire pressure monitoring system of claim 30, wherein said control comprises a microprocessor.

47. The self training tire pressure monitoring system of claim 30, wherein said control comprises a digital signal processor comprising a microcomputer.

48. The self training tire pressure monitoring system of claim 30, wherein each of said at least two pressure sensors comprises a pressure transducer, a temperature sensing means, a processor and a transmitter.

49. The self training tire pressure monitoring system of claim 48, wherein said transmitter of said at least two pressure sensors comprises a radio frequency transmitter.

50. The self training tire pressure monitoring system of claim 30, wherein each of said at least two pressure sensors comprises a pressure transducer and a transmitter.

51. The self training tire pressure monitoring system of claim 50, wherein said transmitter of said at least two pressure sensors comprises a radio frequency transmitter.

52. The self training tire pressure monitoring system of claim 51, wherein said control comprises a radio frequency antenna and a receiver.

53. The self training tire pressure monitoring system of claim 30, wherein said set of tires comprises four tires of a vehicle and said at least two pressure sensors comprises at least four pressure sensors, said at least two wheels comprising at least four wheels of the vehicle and said at least two wheel sensors comprising at least four wheel sensors.

54. The self training tire pressure monitoring system of claim 30, wherein said control is positioned at, within or on an interior rearview mirror assembly of the vehicle.

55. The self training tire pressure monitoring system of claim 54, wherein said display is positioned at, within or on said interior rearview mirror assembly of the vehicle.

* * * * *